US009082380B1

(12) United States Patent
Hamilton et al.

(10) Patent No.: US 9,082,380 B1
(45) Date of Patent: Jul. 14, 2015

(54) SYNTHETIC MUSICAL INSTRUMENT WITH PERFORMANCE-AND/OR SKILL-ADAPTIVE SCORE TEMPO

(71) Applicant: Smule, Inc., Palo Alto, CA (US)

(72) Inventors: Robert Hamilton, Palo Alto, CA (US); Amanda S. Chaudhary, San Francisco, CA (US); Ari Lazier, San Francisco, CA (US); Jeffrey C. Smith, Atherton, CA (US)

(73) Assignee: Smule, Inc., San Francisco, CA (US)

( * ) Notice: Subject to any disclaimer, the term of this patent is extended or adjusted under 35 U.S.C. 154(b) by 154 days.

(21) Appl. No.: 13/664,939

(22) Filed: Oct. 31, 2012

Related U.S. Application Data

(60) Provisional application No. 61/553,781, filed on Oct. 31, 2011.

(51) Int. Cl.
*G09B 15/00* (2006.01)
*G09B 15/02* (2006.01)
*G10H 1/00* (2006.01)
*G10H 7/00* (2006.01)

(52) U.S. Cl.
CPC .................................... *G10H 7/002* (2013.01)

(58) Field of Classification Search
None
See application file for complete search history.

(56) References Cited

U.S. PATENT DOCUMENTS

| | | | | |
|---|---|---|---|---|
| 5,587,548 | A | 12/1996 | Smith, III | |
| 7,446,253 | B2 * | 11/2008 | Knapp et al. | 84/722 |
| 7,521,619 | B2 * | 4/2009 | Salter | 84/477 R |
| 7,563,974 | B2 | 7/2009 | Ozaki et al. | |
| 7,799,984 | B2 * | 9/2010 | Salter | 84/477 R |
| 7,893,337 | B2 * | 2/2011 | Lenz | 84/477 R |
| 7,906,720 | B2 | 3/2011 | Delorme | |
| 8,269,094 | B2 * | 9/2012 | Buskies et al. | 84/613 |
| 8,378,194 | B2 * | 2/2013 | Daisy | 84/477 R |
| 8,414,369 | B2 * | 4/2013 | Chiu et al. | 463/7 |
| 8,419,516 | B2 * | 4/2013 | Masuda et al. | 463/7 |
| 8,629,342 | B2 * | 1/2014 | Lee et al. | 84/610 |

(Continued)

FOREIGN PATENT DOCUMENTS

| | | | |
|---|---|---|---|
| KR | 20070019090 | A | 2/2007 |
| KR | 20090091266 | A | 8/2009 |

OTHER PUBLICATIONS

Gaye, L. et al., "Mobile music technology: Report on an emerging community", Proceedings of the International Conference on New Interfaces for Musical Expression, pp. 22-25, Paris, France, 2006.

(Continued)

*Primary Examiner* — Marlon Fletcher
(74) *Attorney, Agent, or Firm* — Haynes and Boone, LLP

(57) ABSTRACT

Notwithstanding practical limitations imposed by mobile device platforms and applications, truly captivating musical instruments may be synthesized in ways that allow musically expressive performances to be captured and rendered in real-time. In some cases, synthetic musical instruments can provide a game, grading or instructional mode in which one or more qualities of a user's performance are assessed relative to a musical score. By constantly adapting to such modes to actual performance characteristics and, in some cases, to the level of a given user musician's skill, user interactions with synthetic musical instruments can be made more engaging and may capture user interest and economic opportunities (e.g., for in-app purchase and/or social networking) over generally longer periods of time.

38 Claims, 10 Drawing Sheets

(56) References Cited

U.S. PATENT DOCUMENTS

| | | | | |
|---|---|---|---|---|
| 2006/0107819 | A1* | 5/2006 | Salter | 84/470 R |
| 2007/0180978 | A1 | 8/2007 | Ozaki et al. | |
| 2007/0221046 | A1* | 9/2007 | Ozaki et al. | 84/612 |
| 2008/0254824 | A1 | 10/2008 | Moraes | |
| 2008/0280680 | A1 | 11/2008 | Dutilly et al. | |
| 2009/0291756 | A1* | 11/2009 | McCauley et al. | 463/31 |
| 2009/0312102 | A1 | 12/2009 | Oberg et al. | |
| 2010/0184497 | A1* | 7/2010 | Cichowlas | 463/7 |
| 2010/0282044 | A1 | 11/2010 | Delorme | |
| 2010/0294112 | A1* | 11/2010 | Asakura et al. | 84/613 |
| 2011/0003638 | A1* | 1/2011 | Lee et al. | 463/35 |
| 2011/0034247 | A1* | 2/2011 | Masuda et al. | 463/35 |
| 2011/0088535 | A1 | 4/2011 | Zarimis | |
| 2011/0107899 | A1 | 5/2011 | Charles | |
| 2011/0130204 | A1 | 6/2011 | Delorme | |
| 2011/0146477 | A1* | 6/2011 | Tsukamoto | 84/485 R |
| 2011/0185880 | A1 | 8/2011 | Charles | |
| 2011/0283868 | A1 | 11/2011 | Behringer et al. | |
| 2011/0316793 | A1 | 12/2011 | Fushiki | |
| 2012/0151344 | A1* | 6/2012 | Humphrey et al. | 715/716 |
| 2012/0160079 | A1 | 6/2012 | Little et al. | |
| 2012/0174735 | A1 | 7/2012 | Little et al. | |
| 2012/0174736 | A1 | 7/2012 | Wang et al. | |
| 2013/0157761 | A1* | 6/2013 | Cichowlas | 463/31 |
| 2013/0180385 | A1* | 7/2013 | Hamilton et al. | 84/603 |
| 2013/0233158 | A1* | 9/2013 | Little et al. | 84/645 |
| 2014/0083279 | A1* | 3/2014 | Little et al. | 84/609 |

OTHER PUBLICATIONS

Wang, Ge. "Designing Smule's iPhone Ocarina." Center for Computer Research in Music and Acoustics, Stanford University. Jun. 2009. Print. 5 pages.

Geiger, G. "Using the Touch Screen as a Controller for Portable Computer Music Instruments" Proceedings of the 2006 International Conference on New Interfaces for Musical Expression (NIME06), Paris France, pp. 61-64.

Geiger, G. "PDa: Real Time Signal Processing and Sound Generation on Handheld Devices" In Proceedings of the International Computer Music Conference, Barcelona, 2003, pp. 1-4.

Schiemer, G. and Havryliv, M. "Pocket gamelan: tuneable trajectories for flying sources in Mandala 3 and Mandala 4", In Proceedings of the 2006 Conference on New Interfaces for Musical Expression, Jun. 2006, Paris France, pp. 37-42.

Tanaka, A. "Mobile Music Making" In Proceedings of the 2004 Conference on New Interfaces for Musical Expression, Jun. 2004, pp. 154-156.

G. Wang et al., "MoPhO: Do Mobile Phones Dream of Electric Orchestras?" In Proceedings of the International Computer Music Conference, Belfast, Aug. 2008.

G. Essl et al., "Mobile STK for Symbian OS." In Proceedings of the International Computer Music Conference, New Orleans, Nov. 2006.

G. Essl et al., "ShaMus—A Sensor-Based Integrated Mobile Phone Instrument." In Proceedings of the International Computer Music Conference, Copenhagen, Aug. 2007.

Robert Bristow-Johnson. "Wavetable Synthesis 101, A Fundamental Perspective." Web. <http://musicdsp.org/files/Wavetable-101.pdf>. Last accessed Mar. 15, 2012. pp. 1-27.

Pakarinen et al. "Review of Sound Synthesis and Effects Processing for Interactive Mobile Applications." Report No. 8, Department of Signal Processing and Acoustics (TKK) Report Series. Mar. 23, 2009. [Retrieved: Feb. 24, 2012]. Web. <http://www.acoustics.hut.fi/publications/papers/mobilesynthandfxreport/mobilesynthandfxreport.pdf> entire document.

Pocket Guitar. Pocket Guitar Review by AppGuide. May 29, 2009. [Retrieved on Feb. 24, 2012]. <http://www.macworld.com/appguide/app.html?id-69168&expand=false>. entire document.

* cited by examiner

SYNTHETIC MUSICAL INSTRUMENT WITH PERFORMANCE-AND/OR SKILL-ADAPTIVE SCORE TEMPO

BACKGROUND

1. Field of the Invention

The invention relates generally to musical instruments and, in particular, to techniques suitable for use in portable device hosted implementations of musical instruments for capture and rendering of musical performances with game-play features.

2. Related Art

The proliferation of mobile, indeed social, music technology presents opportunities for increasingly sophisticated, yet widely deployable, tools for musical composition and performance. See generally, L. Gaye, L. E. Holmquist, F. Behrendt, and A. Tanaka, "Mobile music technology: Report on an emerging community" in *Proceedings of the International Conference on New Interfaces for Musical Expression*, pages 22-25, Paris, France (2006); see also, G. Wang, G. Essl, and H. Penttinen, "Do Mobile Phones Dream of Electric Orchestras?" in *Proceedings of the International Computer Music Conference*, Belfast (2008). Indeed, applications such as Smule Ocarina™, Leaf Trombone®, I Am T-Pain™, Glee Karaoke and Magic Piano® available from Smule, Inc. have shown that advanced digital acoustic techniques may be delivered on iPhone®, iPad®, iPod Touch® and other iOS® devices in ways that provide users and listeners alike with compelling musical experiences.

As mobile music technology matures and as new social networking and monetization paradigms emerge, improved techniques and solutions are desired that build on well understood musical interaction paradigms but unlock new opportunities for musical composition, performance and collaboration amongst a new generation of artists using a new generation of audiovisual capable devices and compute platforms.

SUMMARY

Despite practical limitations imposed by mobile device platforms and applications, truly captivating musical instruments may be synthesized in ways that allow musically expressive performances to be captured and rendered in real-time. In some cases, synthetic musical instruments can provide a game, grading or instructional mode in which one or more qualities of a user's performance are assessed relative to a musical score. By constantly adapting to such modes to actual performance characteristics and, in some cases, to the level of a given user musician's skill, user interactions with synthetic musical instruments can be made more engaging and may capture user interest over generally longer periods of time. Indeed, as economics of application software markets (at least those for portable handheld device type software popularized by Apple's iTunes Store for Apps and the Google Play! Android marketplace) transition from initial purchase price revenue models to longer term and recurring monetization strategies, such as through in-app purchases, user and group affinity characterization and social networking ties, importance of long term user engagement with an application or suite is increasing.

To those ends, techniques have been developed to tailor and adapt the user musician experience and to maintain long term engagement with apps and app suites. Some of those techniques can be realized in synthetic musical instrument implementations in which performance adaptive score tempos are supported. In some cases, continuous adaptation the tempo at which note and chord sequences of a computer readable musical score are presented to a user musician based a level of musical skill observable by the synthetic musical instrument or related computational facilities. In this way, amateur and expert users can be provided with very different, but appropriately engaging, user experiences. Similarly, a given user's experience can be adapted as the user's skill level improves.

More specifically, aspects of these performance- and/or skill-adaptive techniques have been concretely realized in synthetic musical instrument applications that provide adaptive score tempo. These and other realizations will be understood in the context of specific implementations and teaching examples that follow, including those that pertain to synthetic piano- or keyboard-type musical instrument application software suitable for execution on a portable handheld computing devices of the type popularized by iOS and Android smartphones and pad/tablet devices. In some exemplary implementations, visual cues presented on a multi-touch sensitive display provide the user with temporally sequenced note and chord selections throughout a performance in accordance with the musical score. Note soundings are indicated by user gestures captured at the multi-touch sensitive display, and one or more measures of correspondence between actual note soundings and the temporally sequenced note and chord selections are used to grade the user's performance.

In general, both visual cuing and note sounding gestures may be particular to the synthetic musical instrument implemented. For example, in a piano configuration or embodiment reminiscent of that popularized by Smule, Inc. in its Magic Piano application for iPad devices, user digit contacts (e.g., finger and/or thumb contacts) at laterally displaced positions on the multi-touch sensitive display constitute gestures indicative of key strikes, and a digital synthesis of a piano is used to render an audible performance in correspondence with captured user gestures. A piano roll style set of visual cues provides the user with note and chord selections. While the visual cues are driven by a musical score and revealed/advanced at a current performance tempo, it is the user's gestures that actually drive the audible performance rendering. Given this decoupling, the user's performance (as captured and audibly rendered) often diverges from the precise score visually cued. These divergences, particularly divergences from musically scored tempo, can be expressive or simply errant.

As will be appreciated, pleasing musical performances are generally not contingent upon performing to an absolute strict single tempo. Rather, variations in tempo are commonly used as intentional musical artifacts by performers, speeding up or slowing down phrases or individual notes to add emphasis. Indeed, these modulations in tempo (and note velocity) are often described as "expressiveness." Techniques described herein aim to allow users to be expressive while remaining, generally speaking, rhythmically consistent with the musical score.

Accordingly, techniques have been developed to adaptively adjust a current value of target tempo against which timings of successive note or chord soundings are evaluated or graded. Tempo adaptation is based on actual tempo of the user's performance and, in some embodiments, includes filtering or averaging over multiple successive note soundings with suitable non-linearities (e.g., dead band(s), rate of change limiters or caps, hysteresis, etc.) in the computational implementation. In some cases, changes to the extent and parameterization of filtering or averaging windows may themselves be coded in correspondence with the musical score. In any case, by repeatedly recalculating the current value for target tempo throughout the course of the user's performance, both the pace of success visual cues and the temporal baseline against which successive user note/chord sounding are evaluated or graded may be varied.

In this way, expressive accelerations and decelerations of performance tempo are tolerated in the performance evaluation/grading and are adapted-to in the supply of successive note/chord sounding visual cues. Discrimination between expressive and merely errant/random divergences from a current target tempo may be based on consistency of the tempo over a filtering or averaging window. In some cases, expressive accelerations and decelerations of performance tempo may not only be tolerated, but may themselves contribute as a quality metric to the evaluation or grading of a user's performance.

In general, audible rendering includes synthesis of tones, overtones, harmonics, perturbations and amplitudes and other performance characteristics based on the captured gesture stream. In some cases, rendering of the performance includes audible rendering by converting to acoustic energy a signal synthesized from the gesture stream encoding (e.g., by driving a speaker). In some cases, the audible rendering is on the very device on which the musical performance is captured. In some cases, the gesture stream encoding is conveyed to a remote device whereupon audible rendering converts a synthesized signal to acoustic energy.

Thus, in some embodiments, a synthetic musical instrument (such as a synthetic piano, guitar or trombone) allows the human user to control a parameterized synthesis or, in some cases, an actual expressive model of a vibrating string or resonating column of air, using multi-sensor interactions (key strikes, fingers on strings or at frets, strumming covering of holes, etc.) via a multi-touch sensitive display. The user is actually causing the sound and controlling the parameters affecting pitch, quality, etc.

In some embodiments, a storybook mode provides lesson plans which teach the user to play the synthetic instrument and exercise. User performances may be graded (or scored) as part of a game (or social-competitive application framework), and/or as a proficiency measure for advancement from one stage of a lesson plan to the next. In general, better performance lets the player (or pupil) advance faster. High scores both encourage the pupil (user) and allow the system to know how quickly to advance the user to the next level and, in some cases, along which game or instructive pathway. In each case, the user is playing a real/virtual model of an instrument, and their gestures actually control the sound, timing, etc.

Often, both the device on which a performance is captured and that on which the corresponding gesture stream encoding is rendered are portable, even handheld devices, such as pads, mobile phones, personal digital assistants, smart phones, media players, or book readers. In some cases, rendering is to a conventional audio encoding such as AAC, MP3, etc. In some cases, rendering to an audio encoding format is performed on a computational system with substantial processing and storage facilities, such as a server on which appropriate CODECs may operate and from which content may thereafter be served. Often, the same gesture stream encoding of a performance may (i) support local audible rendering on the capture device, (ii) be transmitted for audible rendering on one or more remote devices that execute a digital synthesis of the musical instrument and/or (iii) be rendered to an audio encoding format to support conventional streaming or download.

In some embodiments in accordance with the present invention(s), a method includes using a portable computing device as a synthetic musical instrument, presenting a user of the synthetic musical instrument with visual cues on a multi-touch sensitive display of the portable computing device, capturing note sounding gestures indicated by the user using the multi-touch sensitive display and repeatedly recalculating a current value for the target tempo throughout a performance by the user and thereby varying, at least partially in correspondence an actual performance tempo indicated by the captured note sounding gestures, a pace at which visual cues for successive ones of the note selections arrive at a sounding zone of the multi-touch sensitive display. The presented visual cues are indicative of temporally sequenced note selections in accord with a musical score and the presentation of visual cues is in correspondence with a target tempo.

In some embodiments, the repeatedly recalculating includes, for at least a subset of successive note sounding gestures, (i) computing a distance from an expected sounding of the corresponding visually cued note selection and (ii) updating the current value for the target tempo based on a function of the computed distance. In some embodiments, the target tempo updating is based on the computed distances for only a subset of less than all of the successive note sounding gestures, and the subset is coded in association with the musical score.

In some embodiments, the method further includes identifying particular ones of the visually cued note selections as key notes and, for at least a subset of users or performances characterized as of low musical skill, substantially discounting or ignoring in the target tempo updating the computed distances of note sounding gestures from expected soundings of corresponding key note ones of the visually cued note selections. In some cases, the key note selections are identified in, or in association with, the musical score. In some cases, the key note selections coincide with phrase boundaries in the musical score. In some cases or embodiment, the method further includes characterizing a particular user or performance as of low musical skill based on acceleration of the particular user's sounding gestures, relative to baseline meter of the music score, at one or more key notes identified therein.

In some embodiments, the method further includes (i) determining correspondence of respective captured note sounding gestures with the note selections visually cued in the sounding zone and (ii) grading the user's performance based on the determined correspondences. In some cases, the determined correspondences include: a measure of temporal correspondence of a particular note sounding gesture with arrival of a visual cue in the sounding zone and a measure of note selection correspondence of the particular note sounding gesture with the visual cue. In some cases, the method further includes audibly rendering the performance on the portable computing device in correspondence with the captured note sounding gestures.

In some embodiments, the presented visual cues traverse at least a portion of the multi-touch sensitive display toward the sounding zone. In some cases, the repeatedly recalculating includes, for successive note sounding gestures: (i) computing a respective distance from an expected sounding of the corresponding visually cued note selection and (ii) updating the current value for the target tempo based on a function of the respective distance and similarly computed distances within window of successive note sounding gestures. In some cases, the respective distance is a distance on the multi-touch sensitive display normalized to time or tempo.

In some embodiments, the repeatedly recalculating includes computing, over a window of successive note sounding gestures, a rolling average of tempo lagging and tempo leading contributions to the current value of the target tempo.

In some cases, the rolling average mathematically ignores note sounding gestures that lag or lead the current value of the target tempo by less than a tempo forgiveness threshold. In some cases, the window is a fixed window. In some cases, the window is of variable length and, for at least some of the visually cued note selections, is score coded.

In some embodiments, the synthetic musical instrument is a piano or keyboard. Visual cues travel across the multi-touch sensitive display and represent, in one dimension of the multi-touch sensitive display, desired key contacts in accordance with notes of the score and, in a second dimension generally orthogonal to the first, temporal sequencing of the desired key contacts paced in accord with the current value of the target tempo. In some cases, the sounding zone corresponds generally to a generally linear display feature on the multi-touch sensitive display toward or across which the visual cues travel.

In some embodiments, the synthetic musical instrument is a string instrument. Visual cues code, in one dimension of the multi-touch sensitive display, points of desired contact on corresponding ones of the strings in accordance with the score and, in a second dimension generally orthogonal to the first, temporal sequencing of the desired contacts paced in accord with the current value of the target tempo. In some cases, the sounding zone corresponds generally, for a given one of the strings, to a generally linear display feature on the multi-touch sensitive display toward which respective of the visual cues travel. In some cases, the captured note sounding gestures are indicative of both string excitation and pitch selection for the exited string. In some cases, the captured note sounding gestures include, for a particular string, contact by at least two digits of the user's hand or hands.

In some embodiments, the method further includes presenting on the multi-touch sensitive display a lesson plan of exercises, wherein the captured note selection gestures correspond to performance by the user of a particular one of the exercises; and advancing the user to a next exercise of the lesson plan based on a grading of the user's performance of the particular exercise.

In some embodiments, the portable computing device includes a communications interface and the method further includes transmitting an encoded stream of the note selection gestures via the communications interface for rendering of the performance on a remote device.

In some embodiments, the audible rendering includes modeling acoustic response for one of a piano, a guitar, a violin, a viola, a cello and a double bass and driving the modeled acoustic response with inputs corresponding to the captured note sounding gestures.

In some embodiments, the portable computing device is selected from the group of: a compute pad; a personal digital assistant or book reader; and a mobile phone or media player. In some embodiments, the method further includes geocoding the transmitted gesture stream; and displaying a geographic origin for, and in correspondence with audible rendering of, another user's performance encoded as another stream of notes sounding gestures received via the communications interface directly or indirectly from a remote device.

In some embodiments, a computer program product encodes in one or more media, the computer program product including instructions executable on a processor of the portable computing device to cause the portable computing device to perform the method. In some cases, the one or more media are readable by the portable computing device or readable incident to a computer program product conveying transmission to the portable computing device.

In some embodiments in accordance with the present invention(s), an apparatus includes a portable computing device having a multi-touch display interface and machine readable code executable on the portable computing device to implement the synthetic musical instrument. The machine readable code includes instructions executable to present a user of the synthetic musical instrument with visual cues on a multi-touch sensitive display of the portable computing device. The presented visual cues are indicative of temporally sequenced note selections in accord with a musical score, wherein the presentation of visual cues is in correspondence with a target tempo. The machine readable code is further executable to capture note sounding gestures indicated by the user on the multi-touch sensitive display and to repeatedly recalculate a current value for the target tempo throughout a performance by the user and thereby vary, at least partially in correspondence an actual performance tempo indicated by the captured note sounding gestures, a pace at which visual cues for successive ones of the note selections arrive at a sounding zone of the multi-touch sensitive display.

In some embodiments, the machine readable code is further executable to determine correspondence of respective captured note sounding gestures with the note selections visually cued in the sounding zone and to grade the user's performance based on the determined correspondences. In some cases, the apparatus is embodied as one or more of a compute pad, a handheld mobile device, a mobile phone, a personal digital assistant, a smart phone, a media player and a book reader.

In some embodiments in accordance with the present invention(s), a computer program product is encoded in media and includes instructions executable to implement a synthetic musical instrument on a portable computing device having a multi-touch display interface. The computer program product encodes and includes instructions executable to present a user of the synthetic musical instrument with visual cues on a multi-touch sensitive display of the portable computing device. Visual cues are indicative of temporally sequenced note selections in accord with a musical score and the presentation of visual cues is in correspondence with a target tempo. The computer program product also encodes and includes instructions executable to capture note sounding gestures indicated by the user on the multi-touch sensitive display and to repeatedly recalculate a current value for the target tempo throughout a performance by the user and thereby vary, at least partially in correspondence an actual performance tempo indicated by the captured note sounding gestures, a pace at which visual cues for successive ones of the note selections arrive at a sounding zone of the multi-touch sensitive display.

In some embodiments, the computer program product further includes instructions executable to determine correspondence of respective captured note sounding gestures with the note selections visually cued in the sounding zone and to grade the user's performance based on the determined correspondences. In some cases, the media are readable by the portable computing device or readable incident to a computer program product conveying transmission to the portable computing device.

These and other embodiments in accordance with the present invention(s) will be understood with reference to the description herein as well as the drawings and appended claims which follow.

BRIEF DESCRIPTION OF THE DRAWINGS

The present invention is illustrated by way of example and not limitation with reference to the accompanying figures, in which like references generally indicate similar elements or features.

FIG. 1 depicts an individual performance use and FIG. 2 depicts note and chord sequences visually cued in accordance with a musical score.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DESCRIPTION

Many aspects of the design and operation of a synthetic musical instrument with performance adaptive score tempo and/or quality metrics will be understood based on the description herein of certain exemplary piano- or keyboard-type implementations and teaching examples. Nonetheless, it will be understood and appreciated based on the present disclosure that variations and adaptations for other instruments are contemplated. Portable computing device implementations and deployments typical of a social music applications for iOS® and Android® devices are emphasized for purposes of concreteness. Score or tablature user interface conventions popularized in the Magic Piano®, Magic Fiddle™, Magic Guitar™, Leaf Trombone: World Stage™ and Ocarina 2 applications (available from Smule Inc.) are likewise emphasized.

While these synthetic keyboard-type, string and even wind instruments and application software implementations provide a concrete and helpful descriptive framework in which to describe aspects of the invented techniques, it will be understood that Applicant's techniques and innovations are not necessarily limited to such instrument types or to the particular user interface designs or conventions (including e.g., musical score presentations, note sounding gestures, visual cuing, sounding zone depictions, etc.) implemented therein. Indeed, persons of ordinary skill in the art having benefit of the present disclosure will appreciate a wide range of variations and adaptations as well as the broad range of applications and implementations consistent with the examples now more completely described.

Adaptive Tempo Behavior, for Example in Synthetic Piano-Type Application

Figure 1:
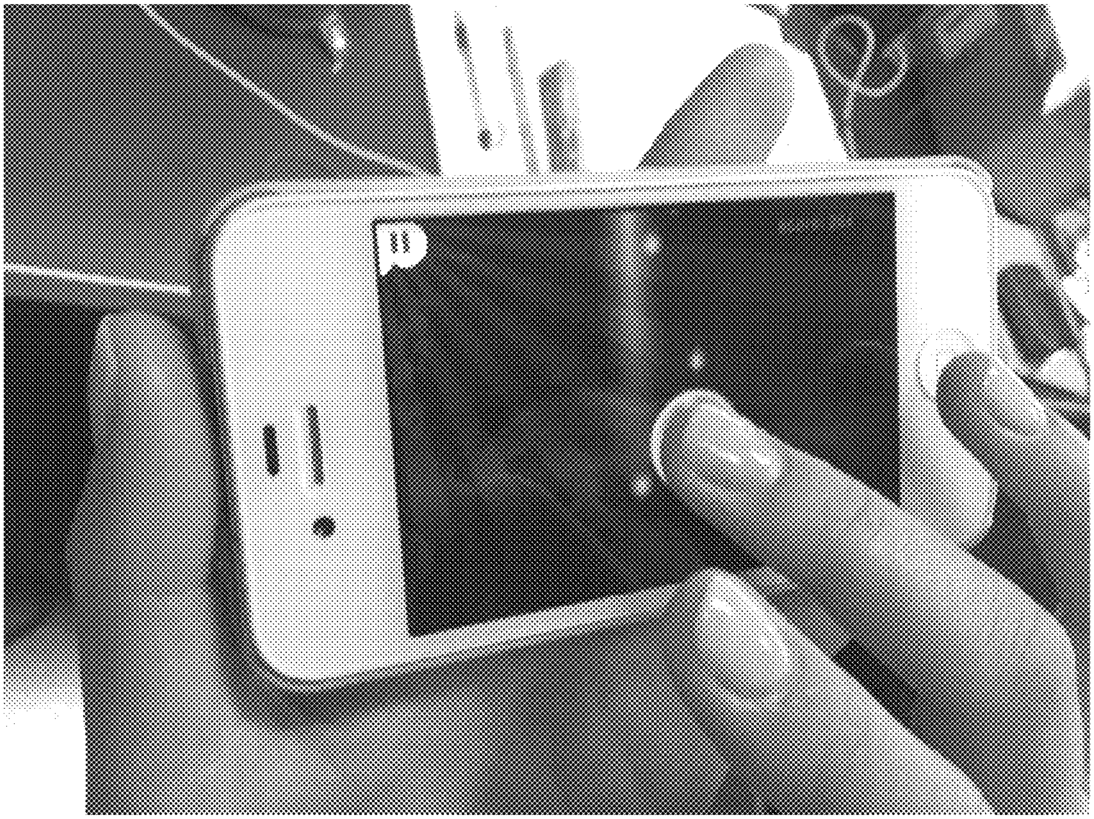
FIGS. 1 and 2 depict performance uses of a portable computing device hosted implementation of a synthetic piano in accordance with some embodiments of the present invention.
Figure 2:
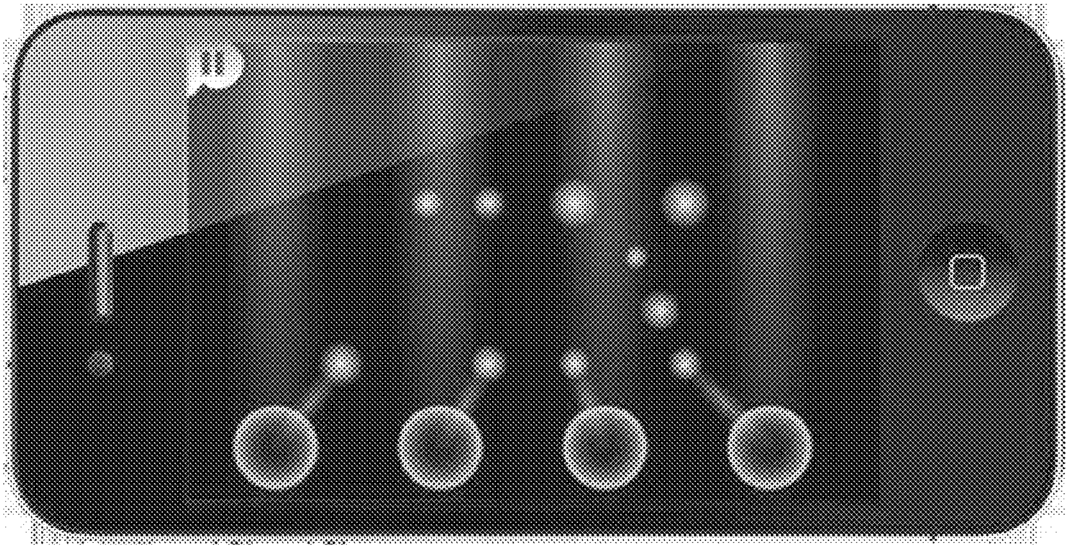

FIGS. 1 and 2 depict performance uses of a portable computing device hosted implementation of a synthetic piano in accordance with some embodiments of the present invention. FIG. 1 depicts an individual performance use and FIG. 2 depicts note and chord sequences visually cued in accordance with a musical score.

Figure 3A:
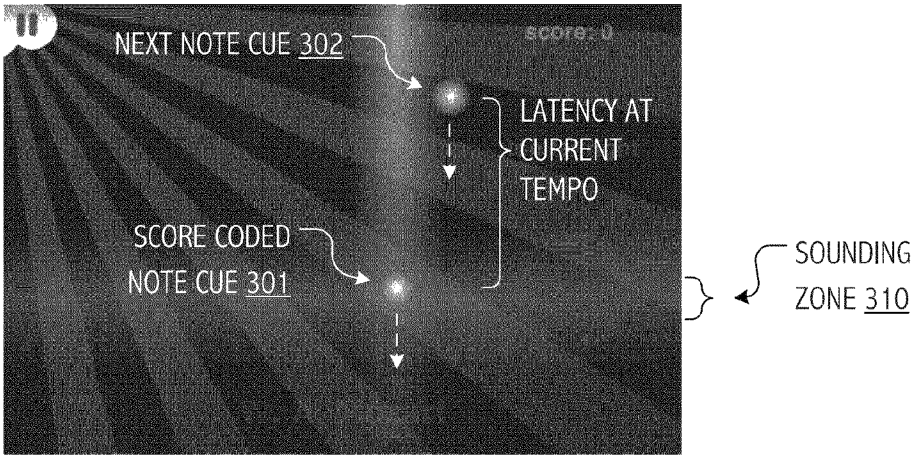
FIGS. 3A, 3B and 3C illustrate spatio-temporal cuing aspects of a user interface design for a synthetic piano instrument in accordance with some embodiments of the present invention.
Figure 3B:
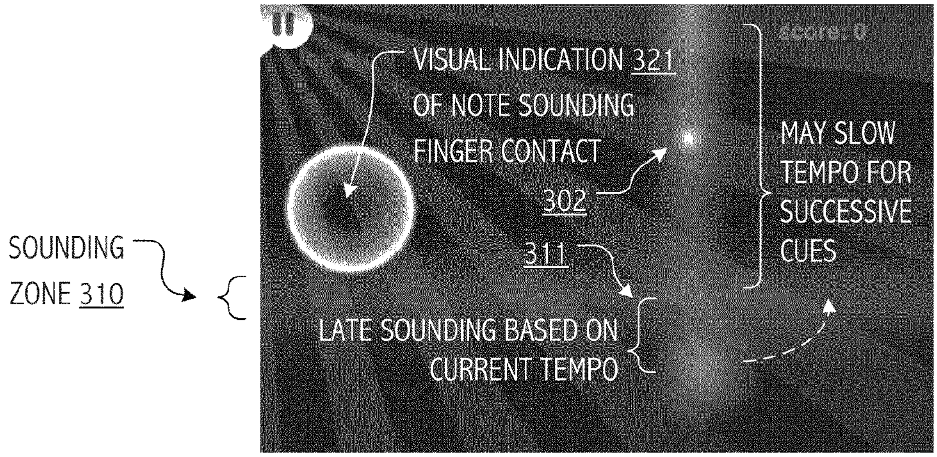
Figure 3C:
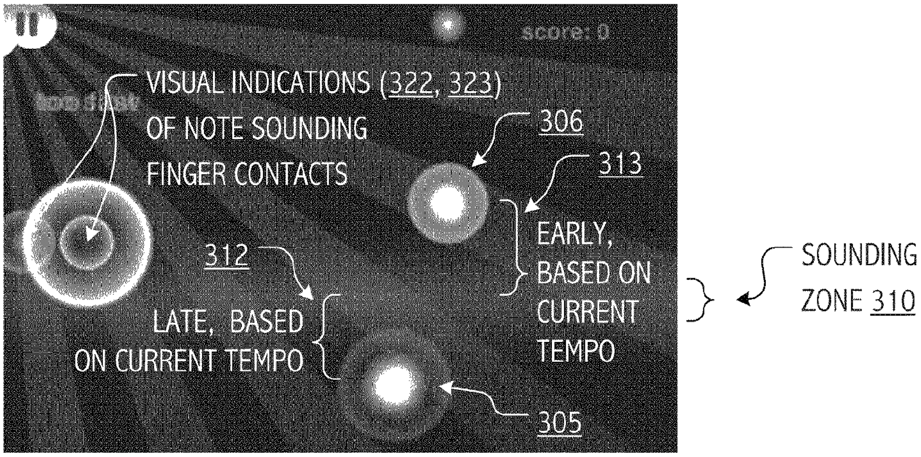

FIGS. 3A, 3B and 3C illustrate spatio-temporal cuing aspects of a user interface design for a synthetic piano instrument in accordance with some embodiments of the present invention. FIG. 3A illustrates a pair of temporally sequenced note cues (301, 302) presented in accord with note/chord selections and meter of an underlying score, as "fireflies" that descend at a rate that corresponds with a current target tempo. In the screen image of FIG. 3A, one of the note cues (note cue 301) appears in a sounding zone 310, suggesting to the user musician, that (based on the current target tempo) the corresponding note is to be sounded by finger contact indicative of a key strike.

FIG. 3B illustrates late sounding (by key strike indicative finger contact by the user musician) of a visually cued note. Thus, the user musician's note sounding gesture (here, a key strike gesture indicated by finger contact with a touch screen of a portable computing device) temporally lags the expected sounding of the score-coded and visually cued (301) note. Note that positioning of visual indication 321 in the screen depiction of FIG. 3B is somewhat arbitrary for purposes of illustration, but in some embodiments may correspond to a touch screen position (or at least a pitch selective lateral position) at which contact is made. In any case, the distance (e.g., a temporal distance or a vertical on-screen distance normalizable thereto) 311 by which the user musician's note sounding lags expected sounding (based on current tempo and score coded meter) may be used (in at least some circumstances described herein) to adapt the rate (here slowing such rate) at which successive note cues are supplied and visually advanced. Thus, and in accord with tempo recalculation techniques described herein, the current tempo, and hence the rate of advance (here, vertical drop) toward sounding zone 310 of visual cues for successive notes and/or chords, may slow in the example of FIG. 3B.

FIG. 3C illustrates near simultaneous sounding (by key strikes indicative of finger contacts by the user musician) of a pair of visually cued notes, one late and one early based on the current tempo. Visual indications 322 and 323 are indicative of such key strike gestures and will be understood to be captured and interpreted by the synthetic piano implementation as attempts by the user musician to sound notes corresponding to successive visually cued notes (see cues 305 and 306) presented on screen in accordance with a musical score and current tempo. Note that relative to current tempo, one of the captured note sounding gestures lags the expected sounding of the corresponding (and earlier in score-coded sequence) note visually cued as 305. Likewise, one of the captured note sounding gestures leads the expected sounding of the corresponding (and later in score-coded sequence) note visually cued as 306. Corresponding distances 312 and 313 (again, temporal distances or vertical on-screen distances normalizable thereto) by which the user musician's note soundings lag and lead expected sounding (based on current tempo and score coded meter) may be processed by adaptive score tempo algorithms described herein and thereby affect the rate at which successive note cues are supplied and visually advanced. Note that in accord with some tempo recalculation techniques described herein, because the successive late and early soundings are not indicative of note sounding a new consistent tempo, the current tempo, and hence the rate of advance (drop) toward the sounding zone of visual cues for successive notes and/or chords, may remain essentially unchanged. Specific exemplary computational techniques will be understood based on description that follows.

Figure 4A:
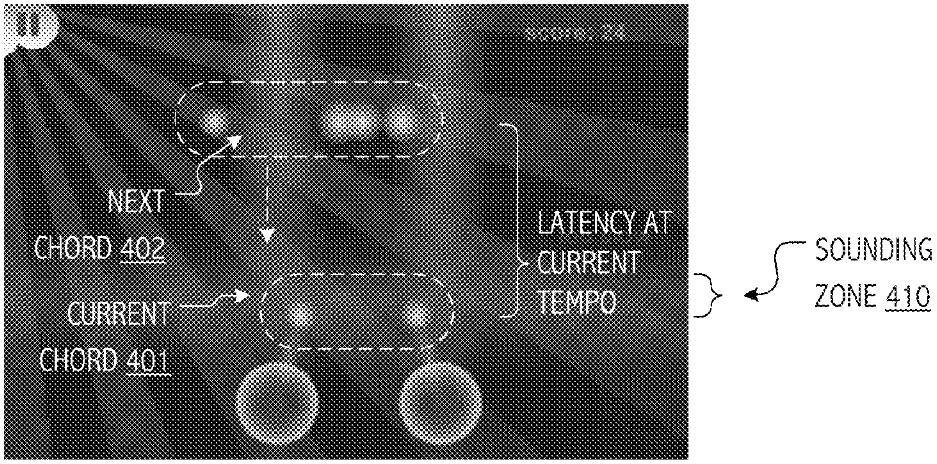
FIGS. 4A, 4B and 4C further illustrate spatio-temporal cuing aspects of a user interface design for a synthetic piano instrument in accordance with some embodiments of the present invention.
Figure 4B:
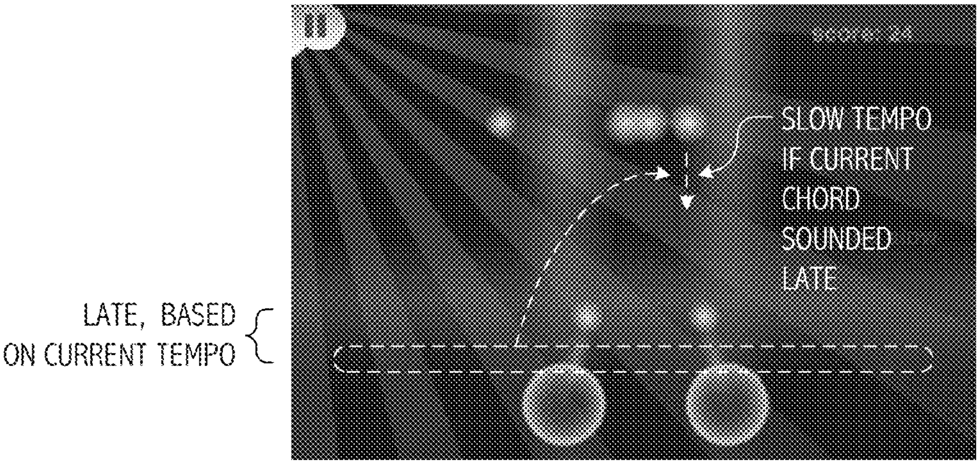
Figure 4C:
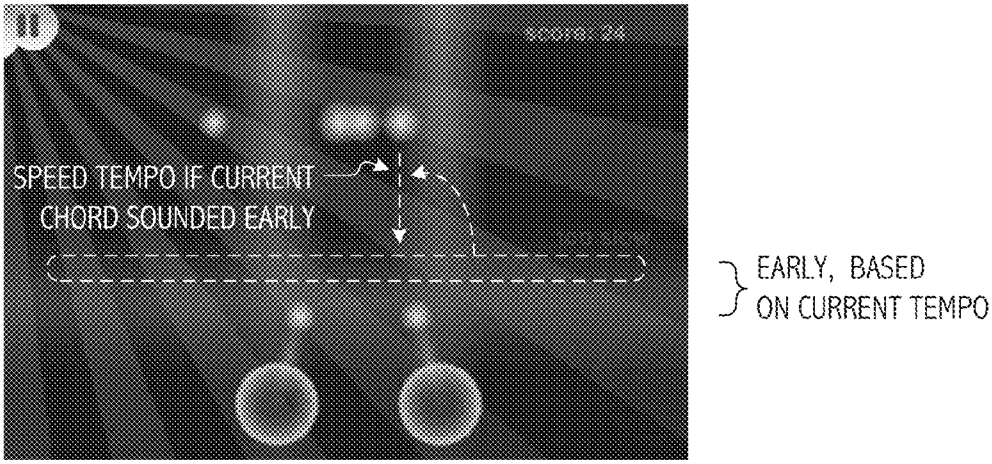

FIGS. 4A, 4B and 4C further illustrate spatio-temporal cuing aspects of a user interface design for a synthetic piano instrument in accordance with some embodiments of the present invention. FIG. 4A illustrates a pair of temporally sequenced visual note cues (401, 402) indicating chords of notes to be sounded at a current target tempo and in correspondence with an underlying score. One of the visual note cues (401) is in a sounding zone 410, suggesting to the user musician that (based on the current target tempo) the notes of the corresponding current chord are to be sounded by a pair of simultaneous (or perhaps arpeggiated) finger contacts indicative of a key strikes. FIG. 4B illustrates possible late sounding (by key strikes indicative of finger contacts by the user musician) of the visually cued current chord. In accord with tempo recalculation techniques described herein, the current tempo, and hence the rate of advance (drop) toward a sounding zone of visual cues for successive chords and/or individual notes to be struck, may slow. FIG. 4C illustrates possible early sounding of the visually cued current chord. In accord with tempo recalculation techniques described herein, the current tempo, and hence the rate of advance (drop) toward the sounding zone of visual cues for successive chords and/or individual notes to be struck, may increase. As before, distances (e.g., temporal distances or vertical on-screen distances normalizable thereto) by which the user musician's soundings of the visually cued chords lag (see FIG. 4B) or lead (see FIG. 4C) expected sounding (based on current tempo and score coded meter) are processed by adaptive score tempo algorithms described herein and may affect the rate at which successive note cues are supplied and visually advanced.

Figure 5:
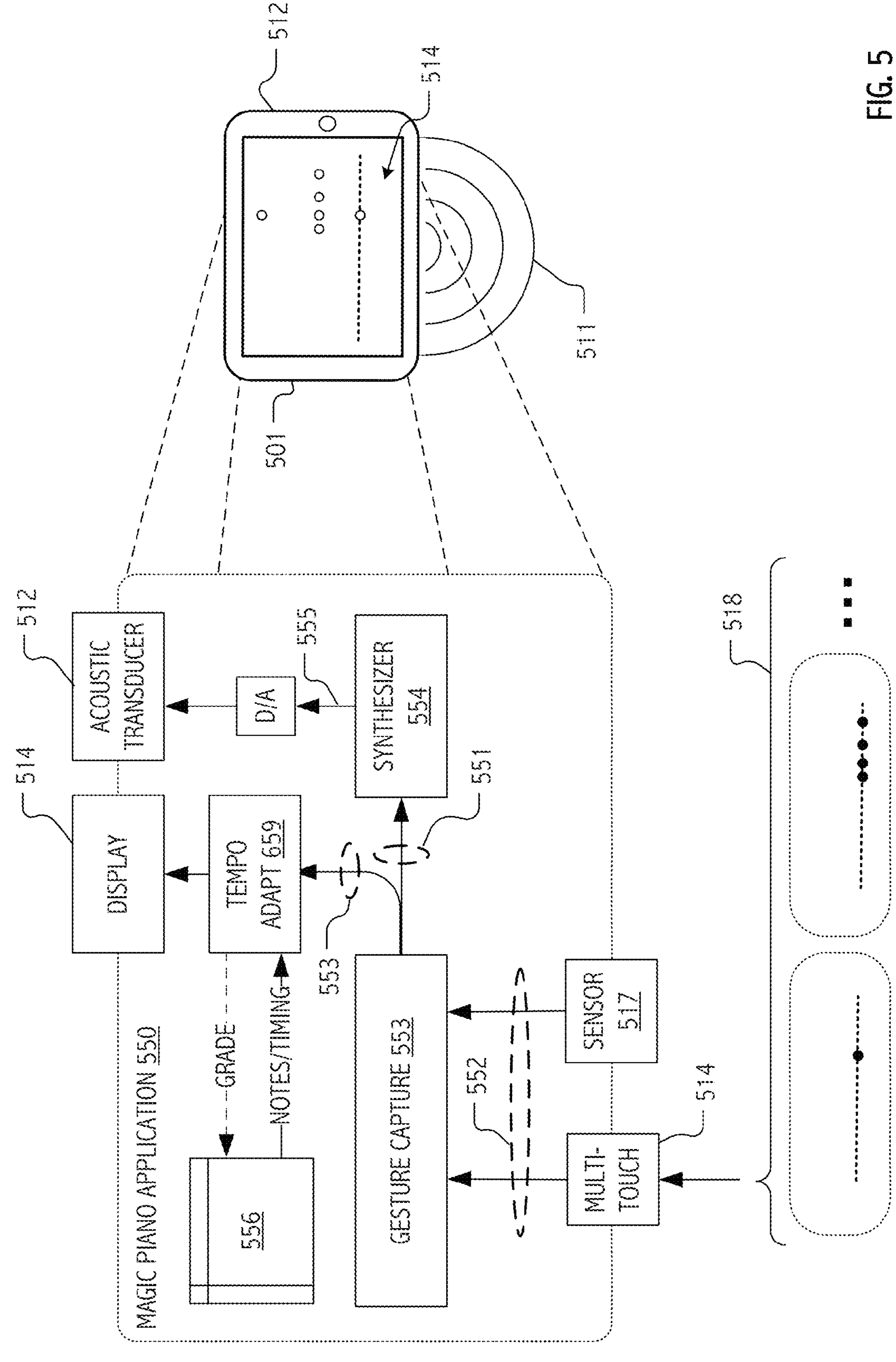
FIG. 5 is a functional block diagram that illustrates capture and encoding of user gestures corresponding to a sequence of note and chord soundings in a performance on a synthetic piano instrument, together with acoustic rendering of the performance in accordance with some embodiments of the present invention.

FIG. 5 is a functional block diagram that illustrates capture and encoding of user gestures corresponding to a sequence of note and chord soundings in a performance on a synthetic piano instrument (e.g., Magic Piano Application 550 executing on portable computing device 501), together with acoustic rendering of the performance in accordance with some embodiments of the present invention. Note sounding gestures 518 indicated by a user musician at touch screen/display 514 of portable computing device 501 are at least somewhat in correspondence with visually presented note cues on touch screen/display 514 and are, in turn, captured (553) and used to drive a digital synthesis (564) of acoustic response of a piano. Such visual cues (recall FIGS. 3A, 3B, 3C, 4A, 4B and 4C) are supplied in accordance with a musical score (notes, chords and meter) stored at least transiently in storage 556 and at a rate that is based on a current tempo that may be continuously adapted (659) based on the user's expressed performance and/or skill as described herein. For purposes of understanding suitable implementations, any of a wide range of digital synthesis techniques may be employed to drive audible rendering (511) of the user musician's performance via a speaker or other acoustic transducer (542) or interface thereto.

In general, the audible rendering can include synthesis of tones, overtones, harmonics, perturbations and amplitudes and other performance characteristics based on the captured gesture stream. In some cases, rendering of the performance includes audible rendering by converting to acoustic energy a signal synthesized from the gesture stream encoding (e.g., by driving a speaker). In some cases, the audible rendering is on the very device on which the musical performance is captured. In some cases, the gesture stream encoding is conveyed to a remote device whereupon audible rendering converts a synthesized signal to acoustic energy.

The digital synthesis (554) of a piano (or other keyboard-type percussion instrument) allows the user musician to control an actual expressive model using multi-sensor interactions (e.g., finger strikes at laterally code note positions on screen, perhaps with sustenance or damping gestures expressed by particular finger travel or via a orientation- or accelerometer-type sensor 517) as inputs. Note that digital synthesis (554) is, at least for full synthesis modes, driven by the user musician's note sounding gestures, rather than by mere tap triggered release of the next score coded note. In this way, the user is actually causing the sound and controlling the timing, decay, pitch, quality and other characteristics of notes (including chords) sounded. A variety of computational techniques may be employed and will be appreciated by persons of ordinary skill in the art. For example, exemplary techniques include wavetable or FM synthesis.

Wavetable or FM synthesis is generally a computationally efficient and attractive digital synthesis implementation for piano-type musical instruments such as those described and used herein as primary teaching examples. However, and particularly for adaptations of the present techniques to syntheses of certain types of multi-string instruments (e.g., unfretted multi-string instruments such as violins, violas cellos and double bass), physical modeling may provide a livelier, more expressive synthesis that is responsive (in ways similar to physical analogs) to the continuous and expressively variable excitation of constituent strings. For a discussion of digital synthesis techniques that may be suitable in other synthetic instruments, see generally, commonly-owned co-pending application Ser. No. 13/292,773, filed Nov. 11, 2011, entitled "SYSTEM AND METHOD FOR CAPTURE AND RENDERING OF PERFORMANCE ON SYNTHETIC STRING INSTRUMENT" and naming Wang, Yang, Oh and Lieber as inventors, which is incorporated by reference herein.

Referring again to FIG. 5, and with emphasis on functionality of tempo adaptation block 659, timing offsets (or in some embodiments, screen position denominated analogs thereof) that are indicative of a consistent acceleration or deceleration from a current value of target tempo are identified and used (continuously throughout the performance by a user musician) to update a current value or target tempo, and to thereby vary the pace at which successive visual cues for note and chord soundings in accord with a musical score advance toward a sounding zone on screen. In some embodiments, correspondence of a user musician's note sounding gestures with visual cues and a current target tempo contributes to a grading or quality metric for the performance. In some embodiments, such grading or quality metric may be used in a competition or achievement posting facility of a gaming or social music framework.

Adaptive Tempo Behaviors

While some synthetic musical instruments (including Magic Piano for iPad available from Smule Inc.) have implemented a user interface paradigm in which notes are presented in accord with a musical score, users must generally conform (e.g., by tapping graphic icons corresponding to individual notes or chord clusters of notes) their note sounding to fixed tempo at which icons fall into view. While performance "stalls" are generally tolerated, target tempos are nonetheless fixed. Unfortunately, fixed tempo designs are not well adapted to expressive variation by the user musician and, in a game-play mode, would provide little opportunity for grading (or otherwise evaluating or scoring) the users performance except insofar as the performance slavishly conforms to note selections and the precise timing of a musical score.

As a result, synthetic piano implementations described herein utilize an adaptive tempo algorithm to scale the performance and presentation of notes to a user based on that user's actual performance tempo. In some cases or embodiments, observed musical skill may be considered in the tempo adaptation algorithms. In general, if users play notes purposefully and consistently faster, the tempo of note presentation will speed up accordingly to match the user's articulated tempo. Similarly, if users slow down their performance, the tempo of note presentation will accordingly slow down. As will be described later herein, it can be desirable to further specialize behaviors at phrase boundaries and/or key notes; however, purposes of introducing basic adaptive tempo techniques, we focus initially on a simplified model.

In order to score users as hitting the "correct" note, a visually highlighted region (or sounding zone) displayed on the multi-touch sensitive playing screen is used as a sounding (or key strike) zone; notes struck within that zone will be scored (i.e., added to the users total point count for the given song), and the tempo at which they are being struck is included for calculation within the note window used to calculate and smooth tempo. Recall generally the examples of FIGS. 3A, 3B, 3C, 4A, 4B and 4C. Thus, in some embodiments, the highlighted region constitutes a desired or expected note sounding zone and defines a region for calculating "correct" note strikes (e.g., key strikes generally within pitch and/or timing bands in accord with a musical score and current target tempo). A generally larger region for note soundings that lead or lag the current target tempo, and for calculating tempo changes, is independently sizeable. In general, each region or zone can be independently sized (and may be defined temporally or spatially) but for purposes of description and visual depiction will be understood to positionally relate to the sounding zone visually depicted on the multi-touch sensitive display.

Exemplary Code

To facilitate understanding of exemplary implementations the techniques described herein, the following pseudo-code snippet is provided and is illustrative of an embodiment of tempo adaptation (see e.g., tempo adapt block 659, FIG. 5) in which otherwise temporal calculations are normalized to screen position and calculated in a spatial frame of reference.

Basically, the code that follows computes a "rolling average", where the latest tempo estimate is summed against the previous n averages (where n is assigned from TEMPO_AVERAGING_POINTS) and a new average is computed from these values. The averaging over a window of several note/chord soundings tends to pull the computation to the current value of target tempo and not give much weight to abrupt changes unless they continue over several note/chord soundings. In this way the technique is not easily skewed to change tempo with abrupt changes due to unintentional errors (missed or extra notes, etc). Instead, the rolling average will move in a faster or slower direction if the user is consistently playing faster or slow over several notes or chords.

```
double distanceToTarget=m_performer.m_lowest_y-
  TARGET_OFFSET*screenHeight;
double timeToTarget=m_nextplay_time-m_lastplay_time;
if (timeToTarget>0.0) {
  //no change within a specified "forgiveness factor"
  //around the tracking bar
  if (fabs(distanceToTarget)<=TEMPO_FORGIVENESS) {
    distanceToTarget=0.0;
  }
  //cap the amount of acceleration from tapping too quickly
  if (distanceToTarget>64.0) {
    distanceToTarget=64.0;
  }
  double new_scroll_speed;
  //asymmetric
  if (distanceToTarget>0) {
    new_scroll_speed=m_performer.m_scroll_speed+
      m_performer.m_scroll_speed*distanceToTarget/
      SCALING_FACTOR_UP;
  }
  else {
    new_scroll_speed=m_performer.m_scroll_speed+
      m_performer.m_scroll_speed*distanceToTarget/
      SCALING_FACTOR_DOWN;
  }
  double sum=new_scroll_speed;
  for (int i=0; i<TEMPO_AVERAGING_POINTS-1; ++i) {
    m_performer.m_previous_scroll_speed[i]=m_perform-
      er.m_previous_scroll_speed[i+1];
    sum+=m_performer.m_previous_scroll_speed[i];
  }
  m_performer.m_previous_scroll_speed[m_performer.m-
    _previous_scroll_speed.size( )-1]=m_performer.m-
    _scroll_speed;
  sum+=m_performer.m_scroll_speed;
  m_performer.m_scroll_speed=sum/double(TEMPO_AV-
    ERAGING_POINTS+1);
}
```

The new tempo estimate itself is computed from the distance between the current note's position on the screen and TARGET_OFFSET, representing the correct screen position (and hence time) to sound the note (or chord) at the current tempo. Distance is weighted and then used to relatively scale the most recent tempo value, based on a scaling factor (SCALING_FACTOR_UP or SCALING_FACTOR_DOWN).

In some embodiments, asymmetric scaling constants may provide advantages, such as providing for different tempo change gains when playing above or below the sounding zone and to allow independent scaling of speed-up and slow-down if desired. In other embodiments, both scaling factors are set to a uniform value (e.g., 160) that, given other constants illustrated, tend to provide a gain of about 40% in accelerating and decelerating contributions to a target tempo. A forgiveness factor is defined as the area (in pixels) around the correct position in which no tempo changes will occur. In the illustrated code, a TEMPO_FORGIVENESS of about 16 (i.e., ignoring variations of 16 pixels above and below a target sounding point at the center of the sounding zone) adds stability against unwanted tempo fluctuation when the user is trying to play steadily.

Generalizations and Further Refinements

Figure 6:
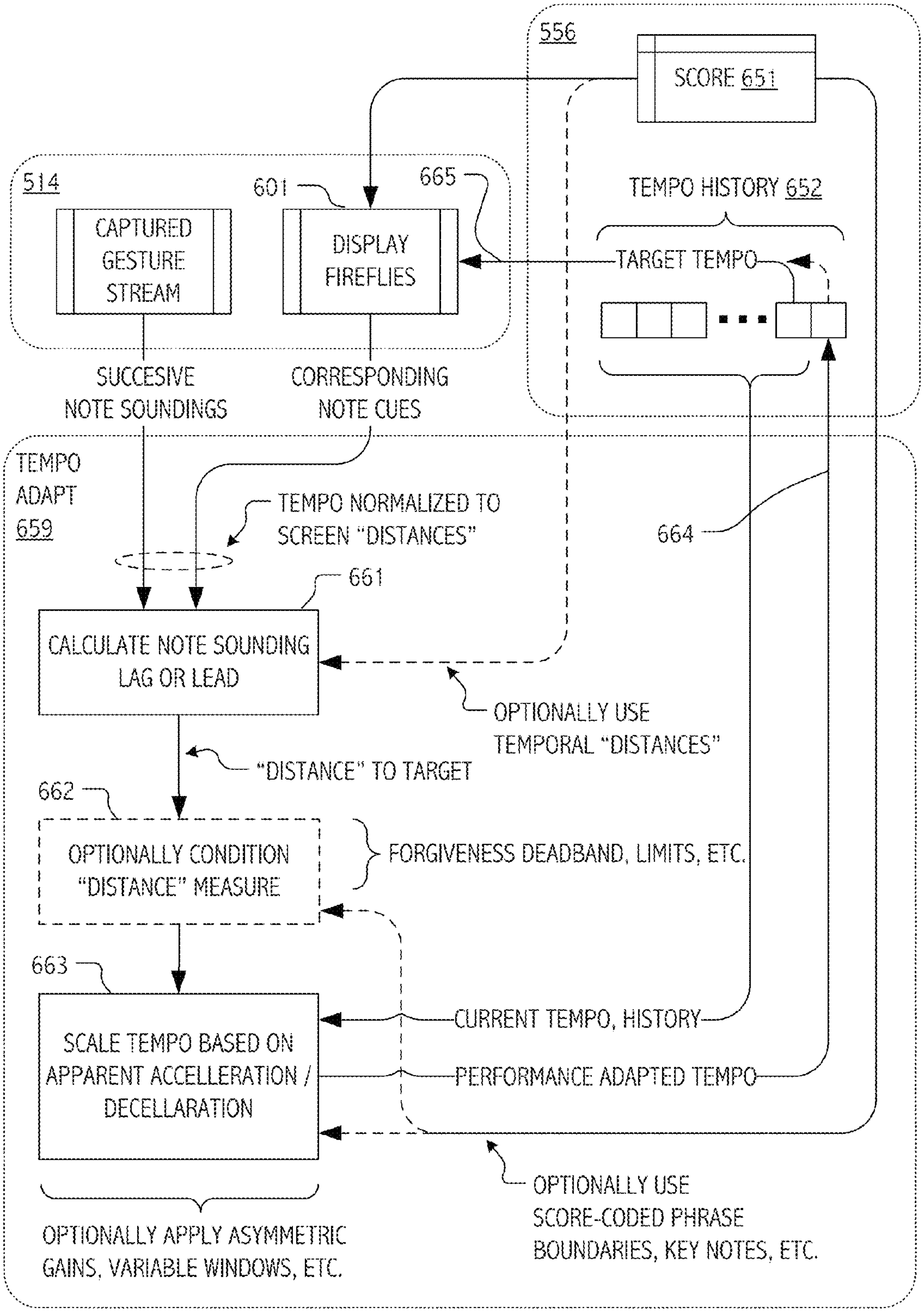
FIG. 6 is a flow diagram that depicts in further detail functional flows of a performance adaptive score tempo implementation in accordance with some embodiments of the present invention.

FIG. 6 is a flow diagram that depicts in further detail certain functional flows of performance adaptive score tempo implementations in accordance with some embodiments of the present invention. Specifically, FIG. 6 illustrates a range of software realizations for tempo adaptation block 659, including some realizations consistent with the foregoing exemplary code. Tempo adaptation block 659 operates on distances between user musician note sounding gestures 601 (captured at in or connection with hardware and event handling facilities of multi touch display 514) and corresponding visual cues 602 displayed on multi touch display 514. In general, such distances can be understood as variances from a score coded meter presented at a current tempo as visual cues 602 travelling as display fireflies (e.g., note cues 301, 302, 305, 306, 401 and 402, recall FIGS. 3A, 3B, 3C, 4A, 4B and 4C) across display 514. For computational convenience, and as illustrated in the foregoing exemplary code, tempo can be representative of temporal distance but normalized to screen distances (e.g., relative pixel position in the vertical dimension of display 514). Alternatively, distance calculations can be implemented in a more overtly temporal frame of reference based on score-coded meter and note onset timings presented at a current tempo. In either case, code implementations of tempo adaptation block 659 repeatedly calculate for successive captured note sounding gestures a lagging or leading distance (see 661) from score-derived targets. For example, in some embodiments, distance (lagging or leading) for a particular note sounding gesture captured at multi-touch sensitive display 514 is calculated relative to a corresponding visually cued note/chord selection of score 651, which has been presented and travels across display 514 in accordance with a score-coded meter and current tempo. In the illustrated flow, score-defined quantities (e.g., note/chord selection and meter) and a current target tempo are each retrieved from suitable data structures instantiated in storage 556.

In general, musical scores in storage 556 may be included with a distribution of the synthetic musical instrument or may be demand retrieved by a user via a communications interface as an "in-app" purchase. Generally, scores may be encoded in accord with any suitable coding scheme such as in accord with well known musical instrument digital interface-(MIDI-) or open sound control- (OSC-) type standards, file/message formats and protocols (e.g., standard MIDI [.mid or .smf] formats, extensible music file, XMF formats; extensible MIDI [.xmi] formats; RIFF-based MIDI [.rmi] formats; extended RMID formats, etc.). Formats may be augmented or annotated to indicate operative windows for adaptive tempo management and/or musical phrase boundaries or key notes.

Measures of lagging or leading distance from target (i.e., between a note sounding gesture and the corresponding visual cue) may optionally be conditioned (662) using a forgiveness dead band (e.g., to tolerate and ignore small lags and leads) and/or using limits on maximum distances by which a note sounding will be considered to lag a visual cuing. Alternatively or additionally, and as more completely explained below, musical skill discriminating embodiments, score-coded identifications of musical phrase boundaries or key notes may be used to selectively ignore or de-emphasize certain note targets in an adaptive tempo calculus. Eventually, scaling adjustments are calculated (663) and applied (664) to adjust the current value of target tempo (665) used to modulate a score-coded meter for presentation of successive note cues (e.g., successive display fireflies 601) in correspondence with successive notes/chords from score 651. Asymmetric lag and lead adjust gains, window-based smoothing (in some cases with variable window size defined in accord with score-coded phrase boundaries or delimited to exclude score coded key notes) or other desirable filtering/adaptation may be applied.

Figure 7A:
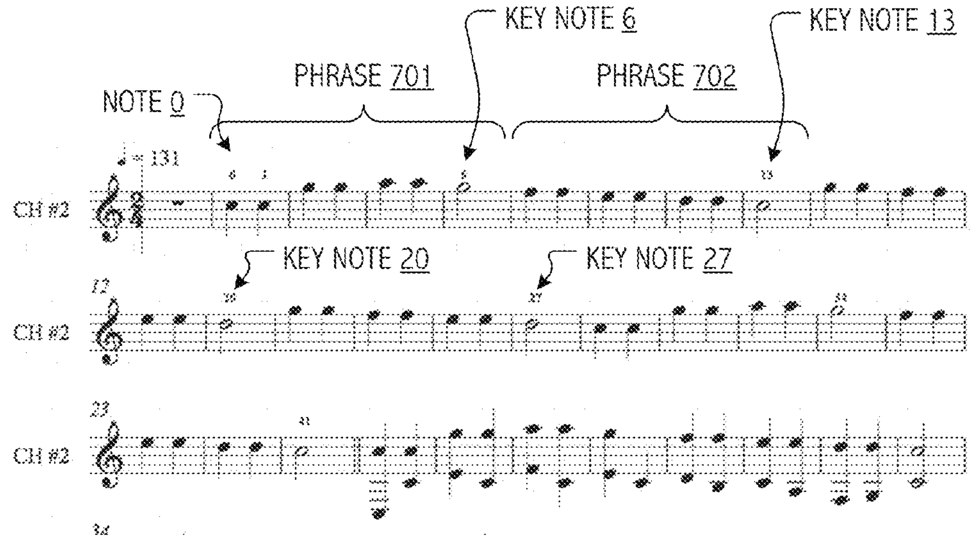
FIG. 7A visually depicts an initial portion of an example musical score.
Figure 7B:
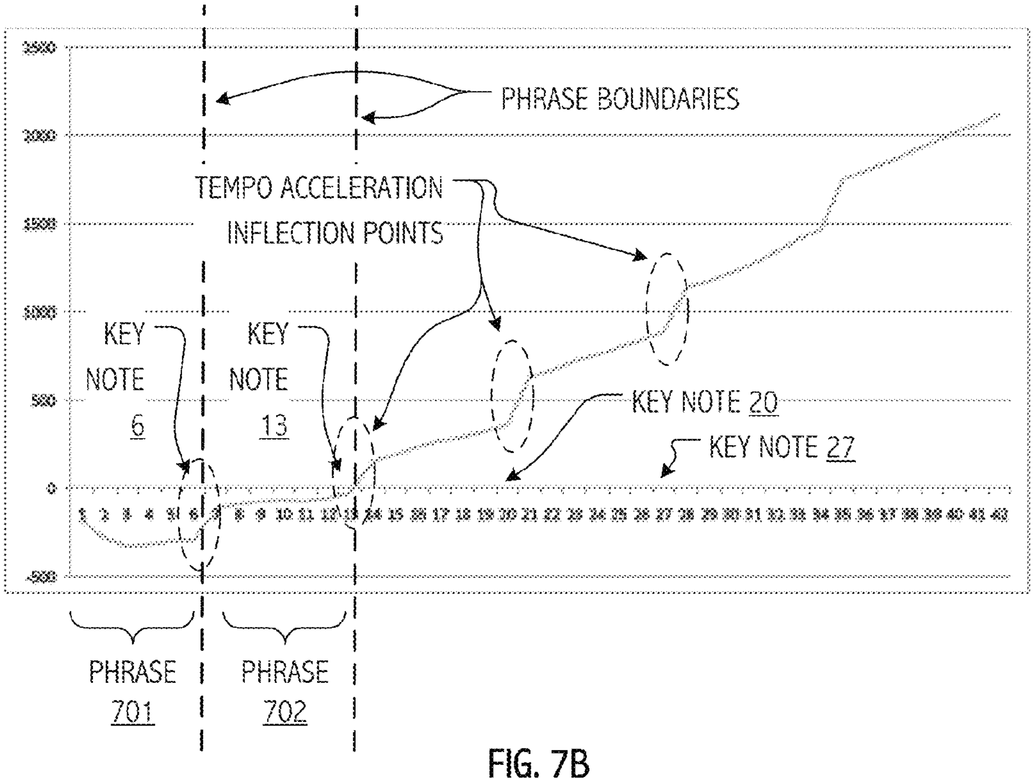
FIGS. 7B and 7C graphically depict features statistically observable relative to performances of the FIG. 7A musical score by respective classes of user musicians, which are, in turn, actionable in some devices or systems that provide performance adaptive score tempo adjustments in accordance with some embodiments of the present invention.
Figure 7C:
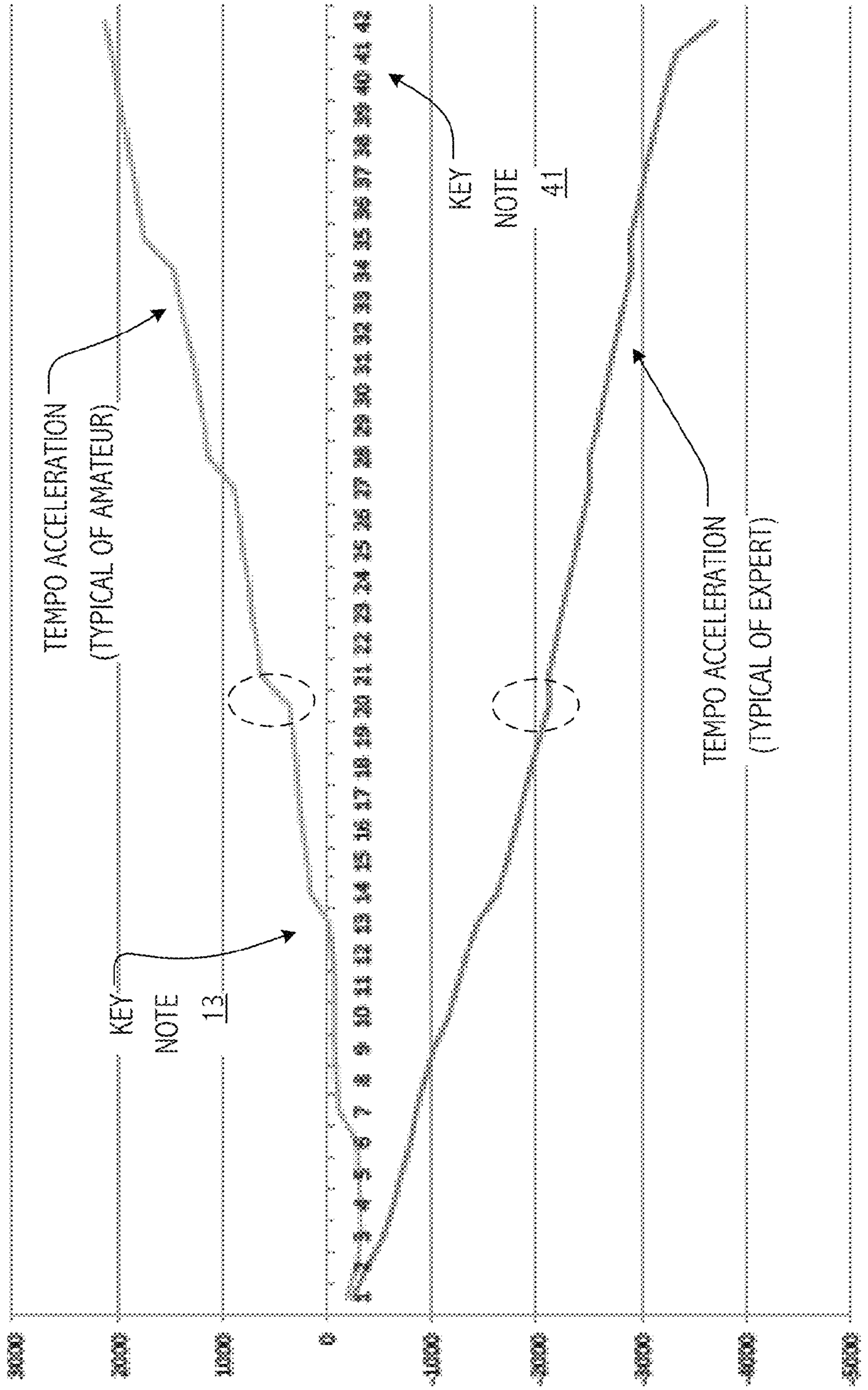

Turning next to FIGS. 7A, 7B and 7C, it has been observed, based on large samples of user musician performance data, that users of differing skill levels tend to present differing challenges for performance adaptive tempo techniques. Specifically, it has been observed that amateur musicians often (even typically in a statistical sense) tend to accelerate an expressed performance tempo of note soundings at boundaries between phrase boundaries of a musical score. While phrase boundaries in a given musical score may, in general, be determined or notated based on a variety of music theoretic factors, and may be generated computationally or upon inspection by a trained musician, the basic role of such phrase boundaries in an adaptive tempo implementation may be understood with reference to a simple example.

FIG. 7A depicts (in a human readable form) an initial portion of a musical score for "Twinkle, Twinkle Little Star." Persons of ordinary skill in the art will appreciate that a corresponding computer readable encoding (e.g., as annotated MIDI data) may be represented in storage 556 and employed in tempo adaptation algorithms as described herein. Specifically, we observe relative to the foregoing discussion of amateur vs. skilled musicians that certain key notes (e.g., half notes at note positions 6 [key note 6, "twinkle twinkle little star"], 13 [key note 13, "how I wonder what you are"], 20 [key note 20, "up above the world so high"], 27 [key note 27, "like a diamond in the sky"], 34 and 41) coincide with demonstrable and well recognized phrase boundaries. In the illustration phrased 701 and 702 (corresponding to "twinkle twinkle little star" and "how I wonder what you are") are notated; however, persons of ordinary skill in the art will appreciate additional phrases, boundaries therebetween, and possible key notes. It has been observed that a common characteristic of performances by musical amateurs is failure to sustain a note sounding at the phrase boundary and, instead, rush a next cued note sounding well ahead of an expected sounding in accord with score coded meter and a current value of target tempo.

FIG. 7B is a graphical representation of analytical/computational data consistent with the observed tendency of amateur users to rush into the next musical phrase. Specifically, FIG. 7B depicts (relative to the first 43 notes of "Twinkle, Twinkle Little Star") a observed "slope" measured from approximately 1000 individual performances, wherein the Y-axis shows note duration in milliseconds relative to the score coded meter at fixed tempo, and the X-axis is note index (e.g., first note, second note . . . ). The first note's duration, a quarter note, as averaged across the analyzed performances is 645.89 ms, whereas the baseline quarter-note (at 131 BPM) is 457 ms. In other words, on average, users (here a sample of users that turn out to be characterizable as amateurs) played the first note 188.9 ms slower than the baseline established by score-coded meter (with fixed target tempo defined by quarter=131). However, by the end of the performance, the average user is sounding notes at over 2 seconds (2120 ms) faster than the baseline. Of particular interest are the tempo acceleration inflection points, several of which are graphically illustrated in FIG. 7B. Consider the inflection point at key note 6. Here you have the first half-note ("star") and the dominant cadence. The graph suggests that at least this sample set of amateur users cheat the half-note. Note that similar inflection points appear at every cadence of the piece.

Notably for our tempo adjustment techniques, and perhaps for user performance base detection of amateur musicians, the primary (but highly transient) tempo accelerations occur at each of the phrase boundaries.

These accelerations tend to be highly transient and, if incorporated as leading distance contributions to a tempo adaptation calculation such as described above, would tend to inappropriately accelerate tempo for such amateur musicians. Accordingly, using key note or phrase boundary aware techniques explained above, techniques have (in some cases or embodiments) been refined to forego, reduce or limit (at least for amateur musicians) tempo adjustment based on such generally predictable transients. In some embodiments, distributed and/or demand-supplied computer readable encodings of musical scores (e.g., those supplied in furtherance of an "in-app" purchase) may be annotated or otherwise augmented to identify these phrase boundaries and/or key notes, thereby facilitating in tempo adjustment algorithm implementations (see e.g., FIG. 6), the forebearance, reduction or limitation of tempo adjustment responses otherwise indicated.

In contrast, for users that exhibit a high degree of musical skill, foregoing, reducing or limiting the contribution of note sounding gestures that lead meter (at current tempo) of the musical score is typically unnecessary and may reduce the ability of the tempo adjustment algorithms to appropriately track an expressive flourish of the expert musician. Referring illustratively to FIG. 7C and by using performance acceleration measurements at phrase boundaries delimited by just two key notes, here notes 13 and 41 of the musical score for "Twinkle, Twinkle Little Star," it is possible to statistically discriminate between amateur user musicians and those user musicians that exhibit a more considerable level of skill. Indeed, while the amateurs tended to generally accelerate throughout the performance (relative to score coded meter) with high transient acceleration at phrase boundaries, the more musically skilled performers actually tended to decelerate throughout the performance without the notable transients at phrase boundaries.

These distinct and generally discriminable classes of performance characteristics may be accommodated by refinement of our tempo adjustment algorithms in ways that improve the adaptation to performance for both classes of user musicians and, indeed, for an individual user musician as that user musician's level of skill improves. Specifically, for some cases or embodiments in accordance with the present invention, by foregoing, reducing or limiting the tempo adjustment contribution of performance accelerations (or leading distances, recall descriptions relative to FIG. 6), tempo adjustments may be allowed to better track the more general tempo acceleration of an amateur and the more general tempo deceleration of the skilled musician without being thrown off by transient accelerations at phrase boundaries typical of the amateur user musician. Note further that because is generally possible to discriminate between amateurs and skilled musicians (either in real time or based on prior characterization and binding of identities), it is generally not necessary to forego, reduce or limit the tempo adjustment contributions at phrase boundaries for those users identified or characterized as skilled musicians. Instead, in some embodiments or situations, use of phrase boundary or key note information in the selective application or modulation of tempo adjustments can be limited to apparent amateurs.

Performance Grading, Evaluation or Scoring

Figure 8:
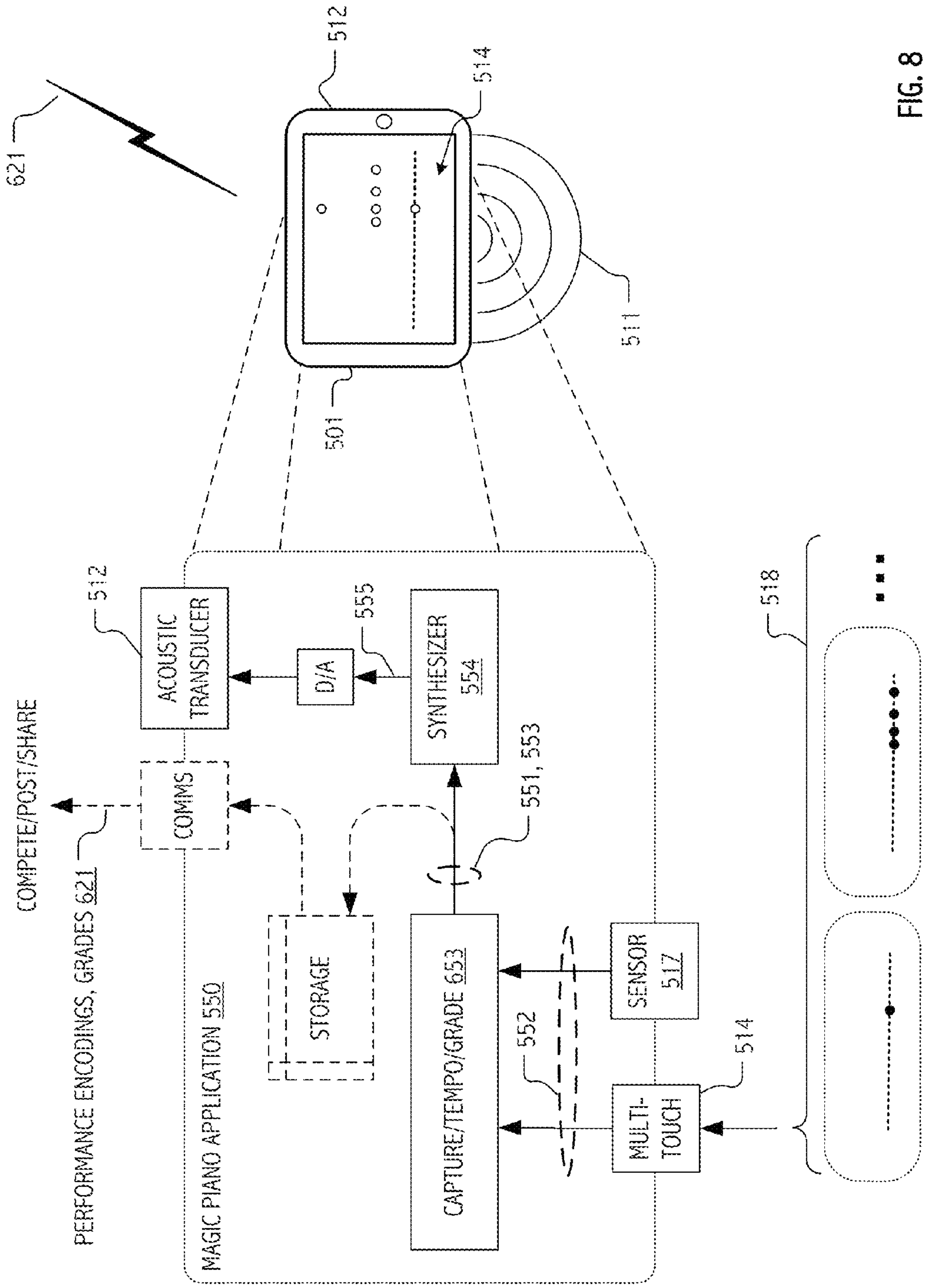
FIG. 8 is a functional block diagram that further illustrates, in addition to gesture capture, tempo variation and performance grading (previously described), optional communication of performance encodings and/or grades as part of a game play or competition framework, social network or content sharing facility in accordance with some embodiments of the present invention.

FIG. 8 is a functional block diagram that further illustrates, in addition to gesture capture, tempo variation and performance grading (previously described), optional communication of performance encodings and/or grades as part of a game play or competition framework, social network or content sharing facility in accordance with some embodiments of the present invention. In the synthetic piano implementations described herein, visual cues for musical score-coded notes and chords fall from the top of the user screen downward.

Specifically, FIG. 8 illustrates (in a manner analogous to that described and explain above with reference to FIG. 5) the capture and encoding of user gestures corresponding to a sequence of note and chord soundings in a performance on a synthetic piano instrument (e.g., Magic Piano Application 550 executing on portable computing device 501), together with acoustic rendering of the performance in accordance with some embodiments of the present invention. As before, note sounding gestures 518 indicated by a user musician at touch screen/display 514 of portable computing device 501 are at least somewhat in correspondence with visually presented note cues on touch screen/display 514 and are, in turn, captured and used to drive a digital synthesis (564) of acoustic response of a piano.

In some embodiments and game-play modes, note soundings by a user-musician are "scored" or credited to a grade, if the notes sounded and the timing thereof both correspond to the musical score and current target tempo. Thus, grading of a users expressed performance (653) will be understood as follows:

A) with respect to individually cued notes, notes struck in horizontal (lateral) alignment with the horizontal screen position of the visual note cue (i.e., tap the screen on top of the note) are credited based on proper note selections, and B) with respect to both chords and individually cued notes, the notes (or constituent notes) struck between the time they vertically enter the horizontal highlighted scoring region (or sounding zone) and the time they leave the region are likewise credited (as in accord with a current tempo). Notes struck before or after the region are not credited, but may nonetheless contribute to a speeding up or slowing down of the current tempo.

In this manner, songs that are longer and have more notes will yield potentially higher scores or at least the opportunity therefor. The music itself becomes a difficulty metric for the performance, some songs will be easier (and contain fewer notes, simpler sequences and pacings, etc.), while others will be harder (and may contain more notes, more difficult note/chord sequences, paces, etc.). Users can compete for top scores on a song-by-song basis so the variations in difficulty across songs are not a concern.

Expressiveness

One design goal for creating a flexible performance tempo grading system was to allow users to create expressive musical performances. As will be appreciated by many a musician, successful and pleasing musical performances are generally not contingent upon performing to an absolute strict single tempo. Instead, variations in tempo are commonly (and desirably) used as intentional musical artifacts by performers, speeding up or slowing down phrases or individual notes to add emphasis. These modulations in tempo (and note velocity) can be described as "expressiveness."

Accordingly, in synthetic piano implementations described herein, we aim to allow users to be expressive while remaining, generally speaking, rhythmically consistent. A user performing the song perfectly at his own tempo, speeding up or slowing down gradually at various times could hypothetically score 100%. If a user abruptly speeds up or slows down (stops playing) those notes will not score, as the averaging window used to speed up and slow down the tempo stretches across approximately 7 notes.

As an added measure of expressiveness, the flexible scoring region provided in synthetic piano implementations described herein also allows users to "roll" chords, striking 2-4 note chords in a slightly arpeggiated fashion (where each note is slightly temporally offset). This kind of expressive performance is musically very effective and is allowed. The tempo value for a chord is determined by the striking of the last note of the chord.

Other Embodiments

Figure 9:
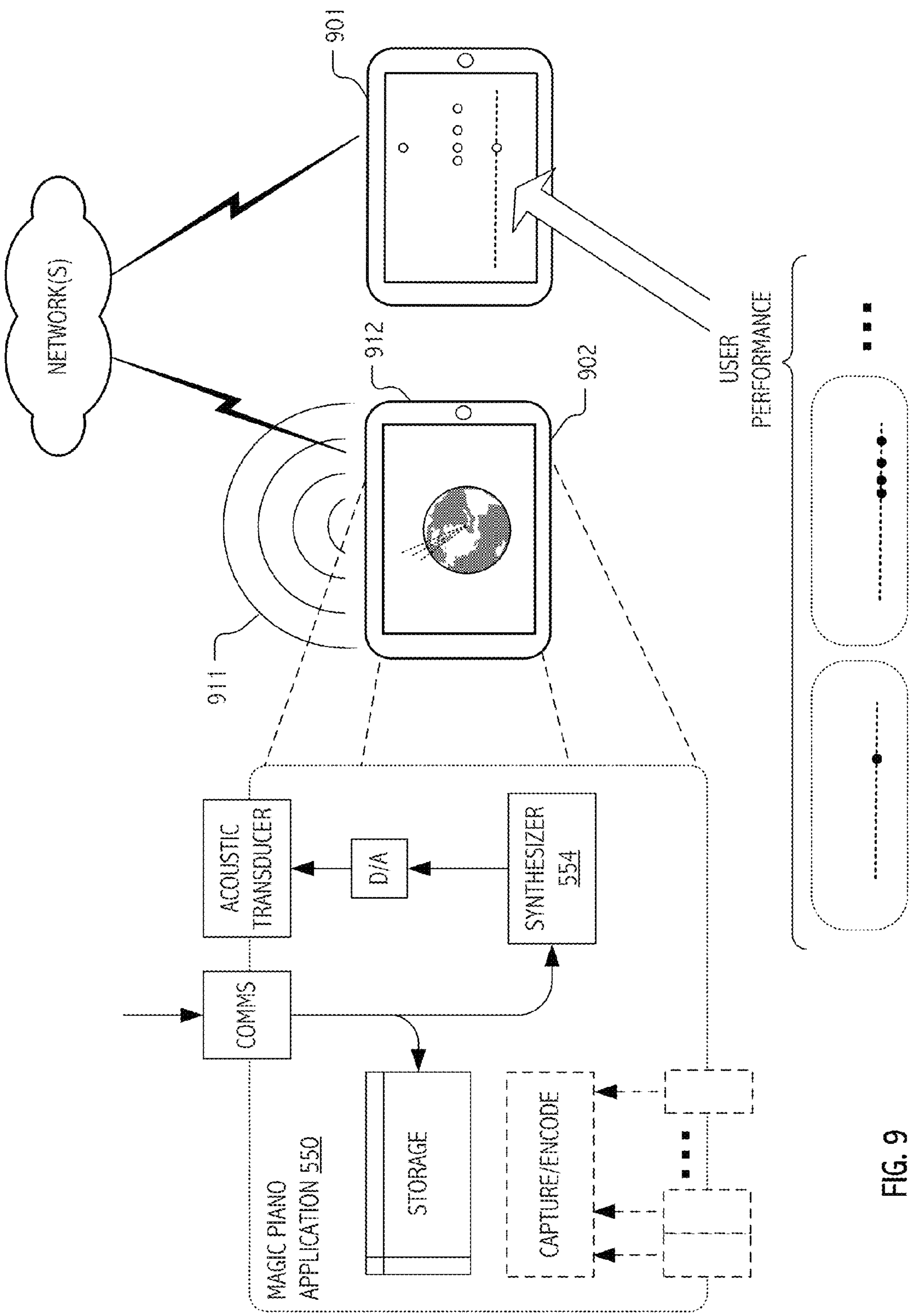
FIG. 9 is a functional block diagram that illustrates capture, encoding and transmission of a gesture stream (or other) encoding corresponding to a user performance on a synthetic piano instrument together with receipt of such encoding and acoustic rendering of the performance on a remote device.
Figure 10:
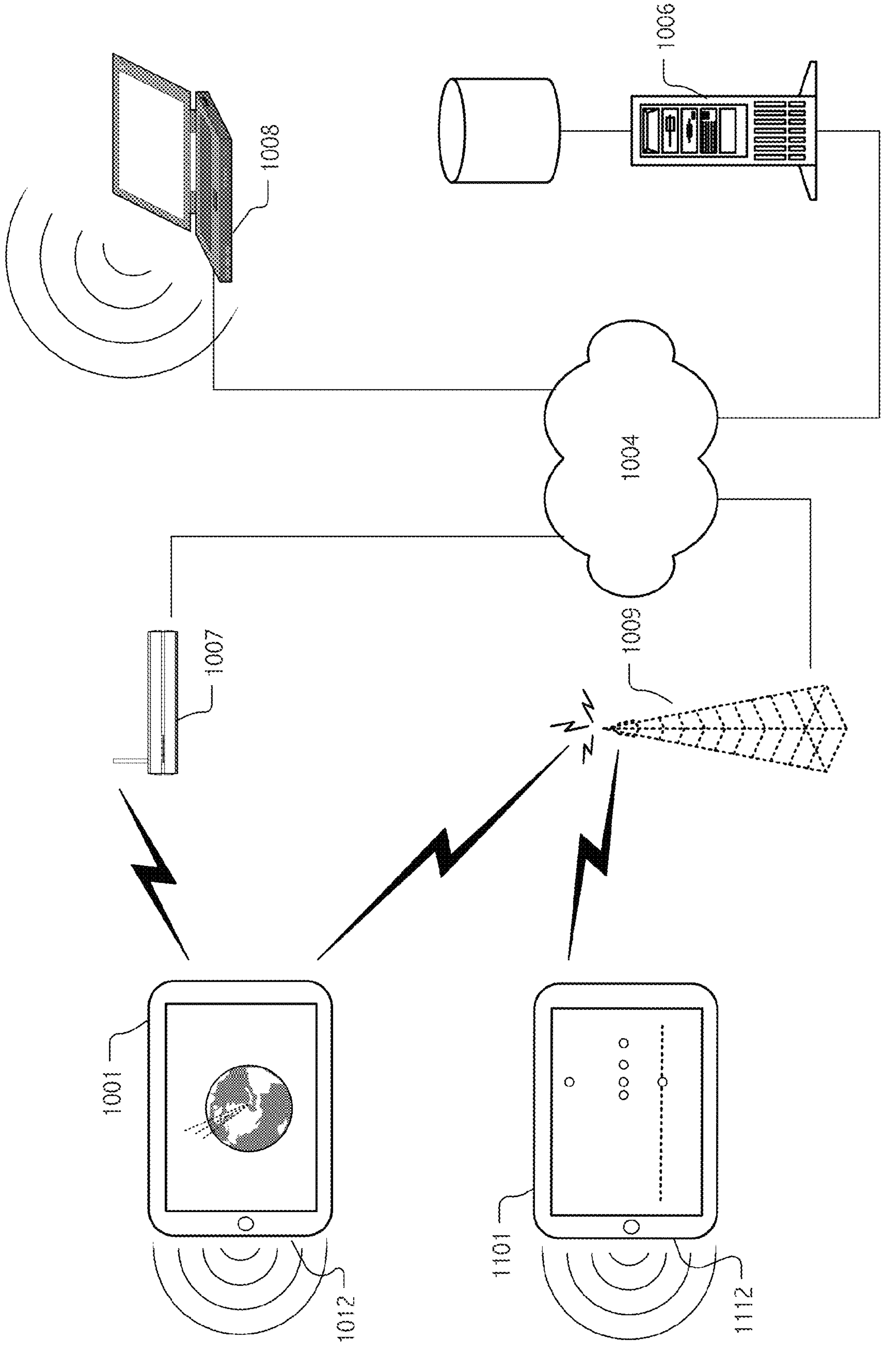
FIG. 10 is a network diagram that illustrates cooperation of exemplary devices in accordance with some embodiments of the present invention.

FIG. 9 is a functional block diagram that illustrates capture, encoding and transmission of a gesture stream (or other) encoding corresponding to a user performance capture at a first instance 901 of a synthetic piano instrument together with receipt of such encoding and acoustic rendering (911) of the performance on a remote device 912 executing a second 902 of the piano instrument. FIG. 10 is a network diagram that illustrates cooperation of exemplary devices in accordance with some embodiments, uses or deployments of the present invention(s).

While the invention(s) is (are) described with reference to various embodiments, it will be understood that these embodiments are illustrative and that the scope of the invention(s) is not limited to them. Many variations, modifications, additions, and improvements are possible. For example, while a synthetic piano implementation has been used as an illustrative example, variations on the techniques described herein for other synthetic musical instruments such as string instruments (e.g., guitars, violins, etc.) and wind instruments (e.g., trombones) will be appreciated. Furthermore, while certain illustrative processing techniques have been described in the context of certain illustrative applications, persons of ordinary skill in the art will recognize that it is straightforward to modify the described techniques to accommodate other suitable signal processing techniques and effects.

Embodiments in accordance with the present invention may take the form of, and/or be provided as, a computer program product encoded in a machine-readable medium as instruction sequences and other functional constructs of software, which may in turn be executed in a computational system (such as a iPhone handheld, mobile device or portable computing device) to perform methods described herein. In general, a machine readable medium can include tangible articles that encode information in a form (e.g., as applications, source or object code, functionally descriptive information, etc.) readable by a machine (e.g., a computer, computational facilities of a mobile device or portable computing device, etc.) as well as tangible storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method comprising:

using a portable computing device as a synthetic musical instrument;

presenting a user of the synthetic musical instrument with visual cues on a multi-touch sensitive display of the portable computing device, the presented visual cues indicative of temporally sequenced note selections in accord with a musical score, wherein the presentation of visual cues is in correspondence with a target tempo;

capturing note sounding gestures indicated by the user using the multi-touch sensitive display; and repeatedly recalculating a current value for the target tempo throughout a performance by the user and thereby varying, at least partially in correspondence with an actual performance tempo indicated by the captured note sounding gestures, a pace at which visual cues for successive ones of the note selections arrive at a sounding zone of the multi-touch sensitive display.

2. The method of claim 1, wherein the repeatedly recalculating includes, for at least a subset of successive note sounding gestures:

computing a distance from an expected sounding of the corresponding visually cued note selection; and updating the current value for the target tempo based on a function of the computed distance.

3. The method of claim 2, wherein the target tempo updating is based on the computed distances for only a subset of less than all of the successive note sounding gestures, and wherein the subset is coded in association with the musical score.

4. The method of claim 2, further comprising:

identifying particular ones of the visually cued note selections as key notes; and for at least a subset of user or performances characterized as of low musical skill, substantially discounting or ignoring in the target tempo updating the computed distances of note sounding gestures from expected soundings of corresponding key note ones of the visually cued note selections.

5. The method of claim 4, wherein the key note selections are identified in, or in association with, the musical score.

6. The method of claim 4, wherein the key note selections coincide with phrase boundaries in the musical score.

7. The method of claim 4, further comprising:

characterizing a particular user or performance as of low musical skill based on acceleration of the particular user's sounding gestures, relative to baseline meter of the music score, at one or more key notes identified therein.

8. The method of claim 1, further comprising:

determining correspondence of respective captured note sounding gestures with the note selections visually cued in the sounding tone; and grading the user's performance based on the determined correspondences.

9. The method of claim 8, wherein the determined correspondences include:

a measure of temporal correspondence of a particular note sounding gesture with arrival of a visual cue in the sounding zone; and a measure of note selection correspondence of the particular note sounding gesture with the visual cue.

10. The method of claim 8, further comprising:

audibly rendering the performance on the portable computing device in correspondence with the captured note sounding gestures.

11. The method of claim 1, wherein the presented visual cues traverse at least a portion of the multi-touch sensitive display toward the sounding zone.

12. The method of claim 1, wherein the repeatedly recalculating includes, for successive note sounding gestures:

computing a respective distance from an expected sounding of the corresponding visually cued note selection; and updating the current value for the target tempo based on a function of the respective distance and similarly computed distances within a window of successive note sounding gestures.

13. The method of claim 12, wherein the respective distance is a distance on the multi-touch sensitive display normalized to time or tempo.

14. The method of claim 1, wherein the repeatedly recalculating includes computing, over a window of successive note sounding gestures, a rolling average of tempo lagging and tempo leading contribution to the current value of the target tempo.

15. The method of claim 14, wherein the rolling average mathematically ignores note sounding gestures that lag or lead the current value of the target tempo by less than a tempo forgiveness threshold.

16. The method of claim 14, wherein the window is of variable length and, for at least some of the visually cued note selections, is score coded.

17. The method of claim 14, wherein the window does not span phrase boundaries in the musical score or include those of the note sounding gestures that correspond to key note ones, if any, of the visually cued note selections.

18. The method of claim 14, wherein the window omits those of the note sounding.

19. The method of claim 1, wherein the synthetic musical instrument is a piano or keyboard, and wherein the visual cues travel across the multi-touch sensitive display and represent, in one dimension of the multi-touch sensitive display, desired key contacts in accordance with notes of the score and, in a second dimension generally orthogonal to the first, temporal sequencing of the desired key contacts paced in accord with the current value of the target tempo.

20. The method of claim 19, wherein the sounding zone corresponds generally to a generally linear display feature on the multi-touch sensitive display toward or across which the visual cues travel.

21. The method of claim 1, wherein the synthetic musical instrument is a string instrument, and wherein the visual cues code, in one dimension of the multi-touch sensitive display, points of desired contact on corresponding ones of the strings in accordance with the score and, in a second dimension generally orthogonal to the first, temporal sequencing of the desired contacts paced in accord with the current value of the target tempo.

22. The method of claim 21, wherein the sounding zone corresponds generally, for a given one of the strings, to a generally linear display feature on the multi-touch sensitive display toward which respective of the visual cues travel.

23. The method of claim 21, wherein the captured note sounding gestures are indicative of both string excitation and pitch selection for the exited string.

24. The method of claim 21, wherein the captured note sounding gestures include, for a particular string, contact by at least two digits of the user's hand or hands.

25. The method of claim 8, further comprising:

presenting on the multi-touch sensitive display a lesson plan of exercises, wherein the captured note selection gestures correspond to performance by the user of a particular one of the exercises; and advancing the user to a next exercise of the lesson plan based on a grading of the user's performance of the particular exercise.

26. The method of claim 1, wherein the portable computing device includes a communications interface, the method further comprising, transmitting an encoded stream of the note selection gestures via the communications interface for rendering of the performance on a remote device.

27. The method of claim 1, wherein the audible rendering includes:

modeling acoustic response for one of a piano, a guitar, a violin, a viola, a cello and a double bass; and driving the modeled acoustic response with inputs corresponding to the captured note sounding gestures.

28. The method of claim 1, wherein the portable computing device is selected from the group of:

a compute pad;

a personal digital assistant or book reader; and a mobile phone or media player.

29. The method of claim 26, further comprising:

geocoding the transmitted gesture stream; and displaying a geographic origin for, and in correspondence with audible rendering of, another user's performance encoded a another stream of notes sounding gestures received via the communications interface directly or indirectly from a remote device.

30. An apparatus comprising:

a portable computing device having a multi-touch display interface; and machine readable code executable on the portable computing device to implement the synthetic musical instrument, the machine readable code including instructions executable to present a user of the synthetic musical instrument with visual cues on a multi-touch sensitive display of the portable computing device, the presented visual cues indicative of temporally sequenced note selections in accord with a musical score, wherein the presentation of visual cues is in correspondence with a target tempo; and the machine readable code further executable to capture note sounding gestures indicated by the user on the multi-touch sensitive display and to repeatedly recalculate a current value for the target tempo throughout a performance by the user and thereby vary, at least partially in correspondence with an actual performance tempo indicated by the captured note sounding gestures, a pace at which visual cues for successive ones of the note selections arrive at a sounding zone of the multi-touch sensitive display.

31. The apparatus of claim 30, the machine readable code further executable to determine correspondence of respective captured note sounding gestures with the note selections visually cued in the sounding zone and to grade the user's performance based on the determined correspondences.

32. The apparatus of claim 30, the machine readable code further executable to compute a distance between an expected and actual sounding of the corresponding visually cued note selection and to update the current value for the target tempo based on a function of the computed distance.

33. The apparatus of claim 30, embodied as one or more of a compute pad, a handheld mobile device, a mobile phone, a personal digital assistant, a smart phone, a media player and a book reader.

34. A computer program product encoded in media and including instructions executable to implement a synthetic musical instrument on a portable computing device having a multi-touch display interface, the computer program product encoding and comprising:

instructions executable on the portable computing device to present a user of the synthetic musical instrument with visual cues on a multi-touch sensitive display of the portable computing device, the presented visual cues indicative of temporally sequenced note selections in accord with a musical score, wherein the presentation of visual cues is in correspondence with a target tempo; and instructions executable on the portable computing device to capture note sounding gestures indicated by the user on the multi-touch sensitive display and to repeatedly recalculate a current value for the target tempo throughout a performance by the user and thereby vary, at least partially in correspondence with an actual performance tempo indicated by the captured note sounding gestures, a pace at which visual cues for successive ones of the note selections arrive at a sounding zone of the multi-touch sensitive display.

35. The computer program product of claim 30, further comprising:

instructions executable on the portable computing device to determine correspondence of respective captured note sounding gestures with the note selections visually cued in the sounding zone and to grade the user's performance based on the determined correspondences.

36. The computer program product of claim 30, further comprising:

instructions executable on the portable computing device to compute a distance between an expected and actual sounding of the corresponding visually cued note selection and to update the current value for the target tempo based on a function of the computed distance.

37. The computer program product of claim 30, wherein the media are readable by the portable computing device or readable incident to a computer program product conveying transmission to the portable computing device.

38. A method comprising:

using a portable computing device as a synthetic musical instrument, wherein the portable computing device includes a communications interface;

presenting a user of the synthetic musical instrument with visual cues on a multi-touch sensitive display of the portable computing device, the presented visual cues indicative of temporally sequenced note selections in accord with a musical score, wherein the presentation of visual cues is in correspondence with a target tempo;

capturing note sounding gestures indicated by the user using the multi-touch sensitive display;

repeatedly recalculating a current value for the target tempo throughout a performance by the user and thereby varying, at least partially in correspondence with an actual performance tempo indicated by the captured note sounding gestures, a pace at which visual cues for successive ones of the note selections arrive at a sounding zone of the multi-touch sensitive display;

transmitting an encoded stream of the note selection gestures via the communications interface for rendering of the performance on a remote device;

geocoding the transmitted gesture stream; and displaying a geographic origin for, and in correspondence with audible rendering of, another user's performance encoded as another stream of notes sounding gestures received via the communications interface directly or indirectly from a remote device.

* * * * *